United States Patent
Luk-Paszyc et al.

(10) Patent No.: US 7,451,022 B1
(45) Date of Patent: Nov. 11, 2008

(54) CALIBRATION OF SHIP ATTITUDE REFERENCE

(75) Inventors: Jerzy W. Luk-Paszyc, Voorhees, NJ (US); John B. Stetson, New Hope, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 13 days.

(21) Appl. No.: 11/647,053

(22) Filed: Dec. 28, 2006

(51) Int. Cl.
*B64G 1/24* (2006.01)
*G01C 21/00* (2006.01)

(52) U.S. Cl. .................. 701/13; 701/222; 701/220; 701/3; 701/4; 244/164

(58) Field of Classification Search .............. 701/220, 701/222, 13, 3, 4; 244/164
See application file for complete search history.

(56) References Cited

U.S. PATENT DOCUMENTS

| | | | |
|---|---|---|---|
| 5,852,792 A * | 12/1998 | Nielson | 701/222 |
| 2005/0071055 A1 * | 3/2005 | Needelman et al. | 701/13 |
| 2007/0038374 A1 * | 2/2007 | Belenkii et al. | 701/222 |

* cited by examiner

Primary Examiner—Mark Hellner
(74) Attorney, Agent, or Firm—Duane Morris LLP

(57) ABSTRACT

A ship includes a star tracker mounted on a platform stabilized in ENU by the inertial navigation system (INS). The line-of-sight (LOS) of the star tracker is directed toward two separated stars, and the LOS difference angles are noted. The angles are processed to generate vector triads representing geodetic (ephemeris) and navigation system attitude. The triads are processed to generate a coordinate transformation matrix. The transformation matrix is separated into systematic error and reference attitude error. The reference attitude error is summed with the inertial navigation system attitude to generate corrected ENU attitude. The corrected attitude is used as a reference for shipboard sensors, to reduce errors when the sensor data is linked to other platforms.

6 Claims, 4 Drawing Sheets

CALIBRATION OF SHIP ATTITUDE REFERENCE

FIELD OF THE INVENTION

This invention relates generally to calibration of a ship's attitude determination system to true geodetic attitude.

BACKGROUND OF THE INVENTION

Naval ships have in the past been used in attack modes, which is to say for striking at the ships, aircraft and terrain of hostile powers. In conjunction with Ballistic Missile Defense (BMD) efforts, ships are increasingly being adapted for defense of a territory against ballistic missiles by being outfitted with equipment for surveillance, ballistic missile target tracking, target discrimination, target typing, and target cueing. In many cases, ships are provided with anti-ballistic-missile capabilities, such as antimissiles for destroying missiles, including intercontinental missiles, which are a threat to friendly territory. Various ballistic missile detection, tracking, and antimissile guidance systems are described in U.S. patent application Ser. Nos. 11/356,675 filed Feb. 16, 2006 in the name of Denis et al., 11/430,535 filed May 9, 2006 in the name of Pedersen et al., 11/430,644 filed May 9, 2006 in the name of Pedersen, and 11/430,647 filed May 9, 2006 in the name of Pedersen et al.

Among the more recent improvements in defense against ballistic missiles is that of communicating missile tracking information among a plurality of sites, which sites may be land-based, ships at sea, aircraft and satellites. This communication allows a sensor(s) at a first site, as for example sensors at a picket ship near a hostile shore, to sense the launch of a hostile missile from the hostile territory. The picket ship may attempt to engage and destroy the hostile missile, but may be unable to because of the head start of the hostile missile before it is initially detected. By sending the picket ship's sensed data, or processed sensed data, to antimissile-equipped platforms farther out to sea, the antimissile defenses of these additional assets can be brought to bear against the hostile missile, with a probability of success which is increased by virtue of the advance or early knowledge of the location, heading and speed of the hostile missile.

When a single ship or other platform performs the detection of the hostile missile and also engages the missile with its antimissile defenses, all of the sensing can be done in a local or ship's reference frame. However, when sensed information from a picket ship is sent to other ships or platforms, there is a potential for error attributable to undesired differences between the local reference frames and a true reference frame or geodetic coordinates. These differences, if not taken into account, can result incorrect interpretation of the data at the remote or data-receiving site, which in turn may cause the antimissile launched by the remote site to initially be directed incorrectly. If the antimissile is initially launched in an incorrect direction, it may not be possible to correct the heading of the antimissile in time to destroy the hostile missile or target. The problem has been solved in the past by relative gridlock techniques. "Relative Gridlock" is known in the art and is described in, for example, R. E. Helmick, J. E. Conte, T. R. Rice, Absolute Alignment of Sensors, NSWCDD/TR-96/46, Dahlgren Div., Surface Warfare Center, and H. O. Ladd, An Optimal Gridlock Solution in Closed Form That can be Implemented Recursively, Lockheed Martin Technical Report, CS-Z-MIS-A-2141, June 1997. The relative gridlock technique is cumbersome.

In general, the attitude reference for a ship is provided by an inertial navigation system (INS), which attempts to provide attitude information or data in terms of local east-north-up (ENU) coordinates. Such inertial navigation systems are subject to drift and bias errors, so the data indicative of attitude may be incorrect on each intercommunicating ship. The INS is initially calibrated to the true North in-port by star sighting on Polaris on a clear night. This procedure is lengthy, and may take as much as 72 hours due to the need for correction of the gyros for the Earth's rotation, which is at a relatively slow rate. At sea, an accurate "local level" can be maintained by corrections available from bathometric data tables for compensation of the inertial gyro vertical deflection error attributable to uneven mass distribution at the sea bottom. "East" and "Up" of the inertial navigation system are not calibrated in port, but instead are calibrated in a laboratory.

A significant improvement in the coordinate transformation accuracy of the ship target data to the earth-centered-fixed (ECEF) coordinates can be achieved by reducing the attitude misalignment between the East-North-Up (ENU) reference established by the ship's inertial navigation unit and true geodetic ENU reference. At sea following the static calibration, recalibration of the inertial navigation system is not performed for lack of a suitable calibration method. Thus, the inertial navigation systems of each of the ships involved in a multiple-platform defense against hostile ballistic-type missiles tend to drift relative to each other, giving rise to unwanted errors which cumulatively may degrade antimissile defense.

SUMMARY OF THE INVENTION

A method according to an aspect of invention is for calibration of an attitude reference apparatus. The method comprises the steps of providing an inertial navigation system for a surface ship, which navigation system provides local reference of ship's attitude relative to East, North, and UP. The method also includes the step of providing a star tracker camera mounted on a platform stabilized by the local reference of ship's attitude. The star tracker compares azimuth and elevation angles between lines-of-sight between the star tracker camera and each of two selected stars, to thereby generate first and second azimuth and elevation difference angles. The line-of-sight of the star tracker is controlled in response to ephemeris of the two selected stars. The azimuth and elevation difference angles are processed to thereby determine first and second vector triads representing ephemeris attitude and navigation system attitude. The first and second triads are processed to determine a coordinate transformation matrix, which in general will comprise small rotation angles. The coordinate transformation matrix is separated into systematic error and reference attitude error. The calibrated navigation system attitude is determined. This may be accomplished by measured sequence of the reference attitude error samples averaged by estimation process to generate calibrated navigation system attitude.

In one embodiment of the invention, sensed data, such as target data, is referenced to the corrected navigation system attitude. This may be accomplished by generating sensed data referenced to said navigation system attitude, and correcting the sensed data by the coordinate transformation matrix.

According to an aspect of the invention, the step of processing the azimuth and elevation angles to determine first and second vector triads representing ephemeris and the navigation system attitude comprises the steps of (a) determining the star tracker local azimuth and elevation angles, (b) determining the star tracker attitude triad from the local azimuth and elevation angles, and (c) determining the geodetic reference attitude triad from ephemeris and the local azimuth and elevation angles.

In one aspect, a method according to an aspect of the invention, the step of determining the star tracker local azimuth and elevation angles comprises computing $$Az_s^\circ = Az_e^\circ + \Delta Az_s^\circ$$

$$El_s^\circ = El_e^\circ + \Delta El_s^\circ \quad (11)$$

where:

$\Delta Az_s^\circ$ is the azimuth difference angle measured by the star tracker between the star tracker line-of-sight to one star; and $\Delta El_s^\circ$ is the elevation difference angle measured by the star tracker between the star tracker line-of-sight to that one star. The step of determining the star tracker attitude triad from the local azimuth and elevation angles comprises computing $$q = v$$

$$r = q \times u / \|q \times u\|$$

$$s = q \times r \quad (20)$$

where u, v are the unit LOS vectors to selected stars q, r, s are unit vectors representing the orthogonal attitude triad where $$v = \begin{bmatrix} X1 \\ Y1 \\ Z1 \end{bmatrix}; u = \begin{bmatrix} X2 \\ Y2 \\ Z2 \end{bmatrix}; q = \begin{bmatrix} q_x \\ q_y \\ q_z \end{bmatrix}; r = \begin{bmatrix} r_x \\ r_y \\ r_z \end{bmatrix}; s = \begin{bmatrix} s_x \\ s_y \\ s_z \end{bmatrix}, \quad (21)$$

| | |
|---|---|
| X1 = Cos (Elv) Sin (Azv) | X2 = Cos (Elu) Sin (Azu) |
| Y1 = Cos (Elv) Cos (Azv) | Y2 = Cos (Elu) Cos (Azu) |
| Z1 = Sin (Elv) | Z2 = Sin (Elu). |

(22),

The step of determining the geodetic reference attitude triad from ephemeris and the local azimuth and elevation angles is performed by computing attitude matrix $M_R$ $$M_R = \begin{bmatrix} q_{Rx} & r_{Rx} & s_{Rx} \\ q_{Ry} & r_{Ry} & s_{Ry} \\ q_{Rz} & r_{Rz} & s_{Rz} \end{bmatrix} \text{ and matrix } M_S: \quad (23)$$

$$M_S = \begin{bmatrix} q_{Sx} & r_{Sx} & s_{Sx} \\ q_{Sy} & r_{Sy} & s_{Sy} \\ q_{Sz} & r_{Sz} & s_{Sz} \end{bmatrix} \quad (24)$$

related by the transformation:

$$AM_R = M_S \quad (25).$$

According to a hypostasis of the invention, the step of combining the reference attitude error with the navigation system attitude to generate calibrated navigation system attitude comprises the step of computing matrix $$\overline{A}_{ENU} = 1/N \sum_{i=1}^{N} A_{ENU,i} \quad (34)$$

where $\overline{A}_{ENU}$ is the averaged value of the skew-symmetric matrix over the batch interval.

DESCRIPTION OF THE INVENTION

Figure 1:
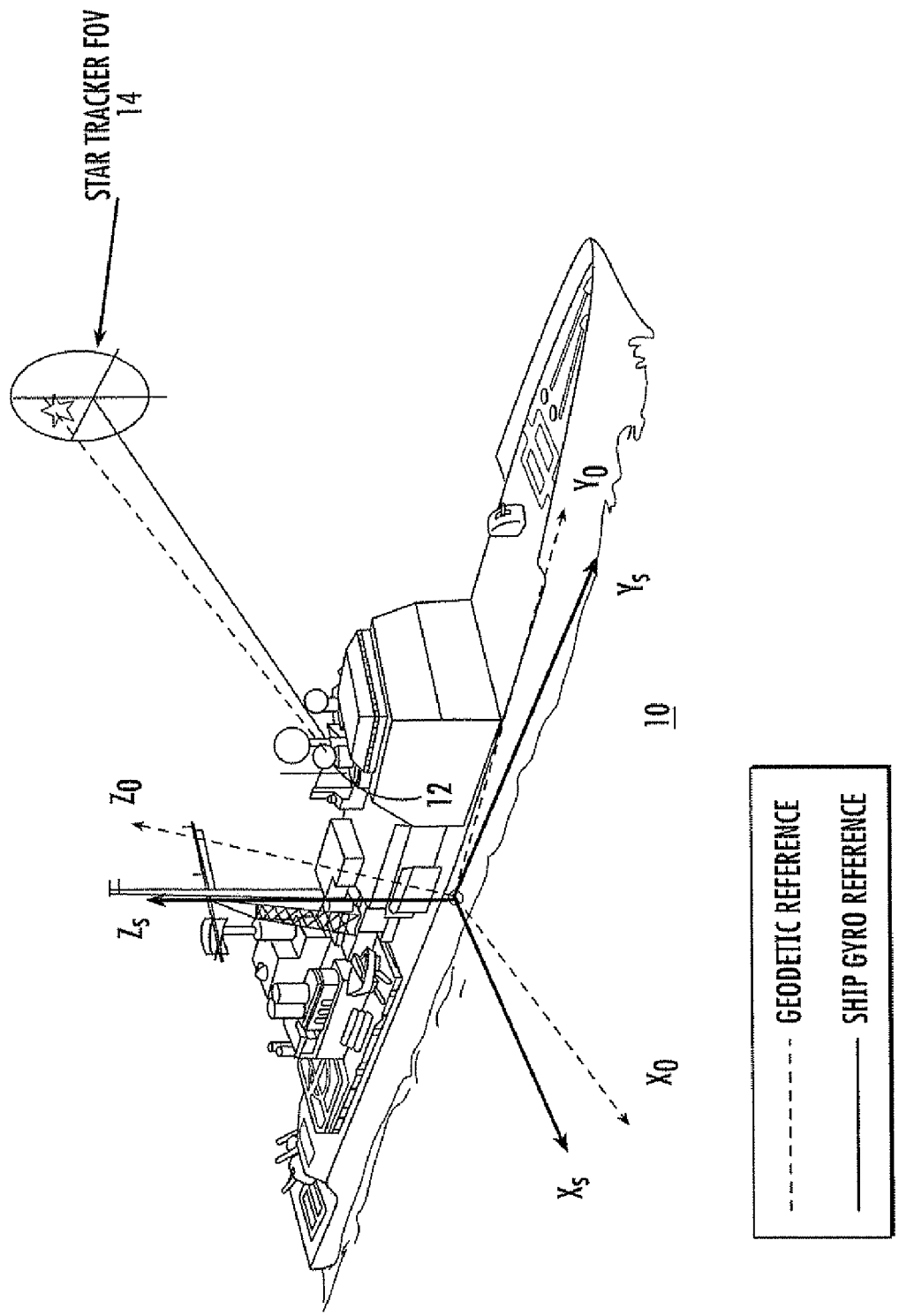
FIG. 1 is a simplified perspective or isometric view of a ship bearing a star tracker, illustrating the star tracker field of view and a star within the field of view.

According to one aspect of the invention, a star tracker camera is mounted on a "gimbal" platform which is stabilized against attitude motion by the ship's local inertial navigation system (INS). The star tracker camera is directed toward first and second selected stars using a suitable ephemeris, and the azimuth and elevation error between each of the stars and the "boresight" or line-of-sight of the star tracker is noted. A vector triad is formed representing the attitude of the ephemeris, and another vector triad is formed representing the inertial navigation system attitude. These triads are processed together to determine the coordinate transformation matrix between the inertial navigation attitude and the ephemeris attitude. The coordinate transformation matrix is utilized with the inertial navigation attitude to generate calibrated attitude information. The hostile missile tracking information is either generated using the calibrated attitude information or is converted using the coordinate transformation matrix before being conveyed to other ships or platforms. Ideally the coordinate transformation matrix is processed to separate systematic error from reference attitude error, and the systematic error component is subtracted from the coordinate transformation matrix to yield reference attitude error. Star tracker measurements include both the ENU attitude errors and ship systematic errors. To estimate the ENU error, the known or determined systematic errors are known are subtracted from the star tracker measurements.

One purpose for adding a star tracking system in the particular case of Aegis ships is to provide means for alignment at-sea of the ship-maintained east-north-up (ENU) reference to the standard geodetic ENU reference frame. The ship's inertial navigation (WSN-7) optical gyros drift and are subject to latitude bias errors which can result in attitude error. These errors, if not corrected, can significantly degrade the accuracy of the Aegis target data fed into the ballistic missile defense (BMD) system command and control, battle management and communication system (C²BMC) and fire control information provided to the ground-based midcourse defense (GBMD) system. The star tracking capability improves accuracy of the target data conversion from the ship's ENU to earth-centered-earth-fixed (ECEF) reference, and also improves the accuracy of the ship's inertial navigation system calibration using satellites (SCUS). The use of a star tracker for ENU calibration of the inertial navigation system is independent of global positioning system (GPS). The star tracker system can also provide additional means for tracking satellites and typing plume characteristic of threat targets, in that a camera is mounted on the director. Furthermore, accurate alignment of stable reference to true geodetic standard reference with the aid of a star tracker eliminates need for the cumbersome "relative gridlock" process when conducting cooperative engagements capability (CEC) engagements with Aegis ships.

FIG. 1 is a simplified perspective or isometric view of an Aegis ship 10, showing a first triad of mutually orthogonal geodetic vectors $X_0$, $Y_0$, and $Z_0$ illustrated by dash lines and a second triad of mutually orthogonal ship gyro or inertial navigation system vectors $X_S$, $Y_S$, and $Z_S$ illustrated by solid lines. FIG. 1 also illustrates a star tracker platform 12. The star tracker field-of-view (FOV) is designated 14.

Figure 2:
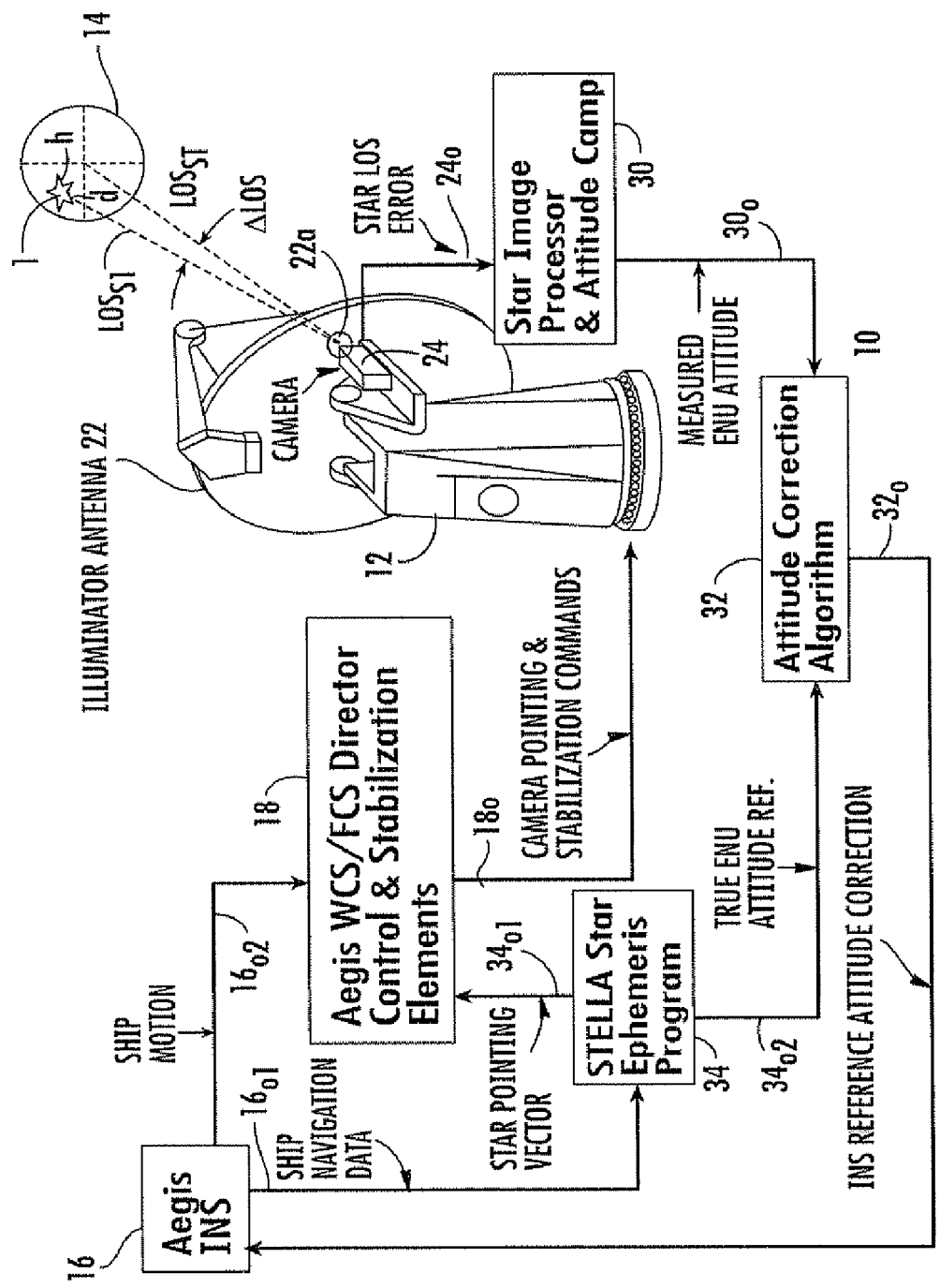
FIG. 2 is a simplified diagram of a system according to an aspect of the invention, illustrating a star tracker camera mounted on a stabilized platform, and processing blocks for processing inertial navigation and star tracker data to generate true geodetic NEU attitude.

FIG. 2 is a simplified diagram, partially in block form and partially in perspective or isometric view, of a ship inertial navigation system together with ancillary elements according to an aspect of the invention. In FIG. 2, the Aegis inertial navigation system (INS) is designated 16. Those skilled in the art will understand that it is not necessary to the invention that it be mounted on or associated with an Aegis ship, but instead that the Aegis description relates to one possible embodiment. The inertial navigation system 16 produces signals on a path 16o1 representing ship navigation data (heading, latitude, and longitude, and signals on a path 16o2 representing ship motion, including attitude motion. The attitude motion signals are applied to an Aegis Director Control and Stabilizer illustrated as a block 18, which generates signals on a path 18o representing illuminator antenna director 12 stabilization signals, so as to maintain the illuminator antenna director 12 stable in an attitude sense. With the illuminator antenna director 12 attitude-stabilized under control of the inertial navigation system 16, the illuminator antenna 22 is held so as to continuously point at whatever angle is commanded. The commands for directing the illuminator antenna 22 depend upon the mission, and may come from a radar system, but are ultimately applied to the director 12 in conjunction with the attitude stabilization commands. In the Aegis system, illuminator pointing commands are derived from target track data provided by the SPY radar, and the illuminator beam pointing is space stabilized by the ship gyro (WSN-&) data. Of course, the description of this particular embodiment is by way of example only.

FIG. 2 also illustrates a modification of an element found on Aegis ships, together with additional elements which are not currently found on an Aegis ship, but which are provided pursuant to the invention. A star "tracker" or camera illustrated as 24 is mounted on the illuminator antenna director 12 so as to be stabilized therewith. This arrangement is completely optional, in that a separate stabilized platform could be provided to support the star tracker or camera 24. In the case of Aegis, such a stabilized platform already exists in the form of the illuminator antenna director 12, and its presence is taken advantage of. As illustrated in FIG. 2, the star tracker 24 is mounted behind an aperture 22a defined in the illuminator antenna 22, which aperture allows the star tracker 24 to view the field of view 14.

Star "tracker" or camera 24 can be any one of a number currently available which are capable of night sighting of stars. Preferably, the star tracker 24 also has the capability of tracking stars during daylight hours, to thereby allow attitude calibration at any time, rather than just at night. Such star trackers are under development by TREX Enterprises Corp., of San Diego, Calif., and operate in the near-red and red portions of the light spectrum. Ideally, the star tracker, whether night-only or day-night, would be of the "image dissector" type which measures the angular deviation of the line-of-sight to the star in question (within the field of view of the star tracker camera) relative to the line-of-sight of the camera itself.

Ship navigational information flows from inertial navigation system 16 of FIG. 2 to a star ephemeris program 34 such as System to Estimate Latitude and Longitude Astronomically (STELLA), which stores information relating to the vector to selected stars from the ship's position, based on true NEU attitude. Stella was developed by US Naval Observatory, and is available to Department of Defense users. Any ephemeris program may be used, however. Ship local latitude, longitude, UTC time and date are needed as inputs to the ephemeris program. This information is available from the ship's inertial navigation system. The ephemeris program selects the best stars for the viewing and computes their LOS angles in the local ENU reference frame. The pointing vector to the selected star is applied from ephemeris 34 by way of a path $34o_1$ to the illuminator antenna director control block 18, which directs the star tracker camera 24 toward the nominal position of the selected star. The true ENU attitude reference information is applied from ephemeris block 34 by way of a path $34o_2$ to an attitude correction block illustrated as 32. Aegis ship INS comprises WSN-7 and GPS, and latitude, longitude and UTC time information are available from both WSN-7 and GPS. In the star tracker INS alignment system according to an aspect of the invention, that information used by the STELLA astronomical software package, which is not currently part of the Aegis system.

Star tracker 24 of FIG. 2 is commanded (by way of commands to the illuminator antenna director) to direct its line-of-sight $LOS_{st}$ toward a selected star, such as star 1 of FIG. 2. Because of system errors, including attitude errors, the line-of-sight $LOS_{st}$ of the star tracker 24 does not fall on or coincide with the selected star 1. Instead, the star tracker line-of-sight $LOS_{st}$ deviates from the star 1 line-of-sight $LOS_{s1}$. The star tracker 24 generates images which include the difference angle $\Delta LOS$ between the $LOS_{st}$ and $LOS_{s1}$. It should be noted that star tracker pointing accuracy is not critical, since the lens of the star tracker camera can be selected to assure containment of the expected deviation of the star image within the field of view. This Star LOS Error information is transmitted from star tracker camera 24 over a path 24o to a star image processor and attitude computation illustrated as a block 30. Block 30 processes the star tracker camera 24 video data to determine LOS angles, which provides the measured attitude triad, so block 30 may be considered to be part of the star tracker. Those skilled in the art will recognize that it may be desirable to filter the camera signals before processing to reduce noise, such as might be occasioned by residual ship motion or vibration of director 12. The length of time required to generate LOS information for one star is expected to be less than 30 seconds, and during such a short time disturbances, such as those attributable to ship and Earth motion, are expected to be small and decoupled from the star tracker camera's pointing. Star image processor and attitude compensator block 30 produces measured ENU attitude information on its output data path 30o.

Attitude correction algorithm block 32 receives true ENU attitude information from STELLA by way of data path $34o2$ and also receives measured ENU attitude information from star image processor and attitude compensator 30 by way of data path 30o. Attitude correction algorithm block 32 determines the INS reference attitude correction and couples the correction by way of data path 32o back to the inertial navigation system 16, where the INS correction can be incorporated.

The measurements of the star tracker LOS include, beside misalignment of ENU references, contributions from other systematic error sources such as the measurement accuracy of the attitude sensors, director pointing accuracy, and misalignment of reference between the ship's elements involved in the star tracking process. The misalignment between the ship ENU and reference ENU can be estimated from the attitude difference between their respective attitude triads, established using vectors from sighting at two stars. Since the ENU error mostly contain bias, the star tracker measurements can be separated into two skew-symmetric error matrices, so that the ENU error estimation can be performed simply by a batch least squares or averaging process. Kalman filter method can be utilized if the empirical data obtained from the test on the physical systems indicates a need for such a filter. The accuracy of the batch averaging estimation is expected to be adequate, since the values of the systematic errors in the system are known form past error analyses and battery alignment procedures such as those performed for the AEGIS combat system. The knowledge of the systematic error values can be improved further by a registration process and establishing of adaptation tables for the individual ships. The estimation process corrects the ship-established ENU references in a form of a small angle rotation matrix which can be applied to the coordinate transformation of the ship's ENU-to-ECEF reference and ENU-to-ship-deck reference.

The misalignment of the ship's ENU reference from the true geodetic ENU reference is caused by the ship's navigation errors, such as INS bias errors in alignment to true North and measurement of the local gravity vector (vertical deflection). However, the star tracker measurements also include ship systematic errors which are, to the extent possible, excluded from the ENU error estimation.

Figure 3:
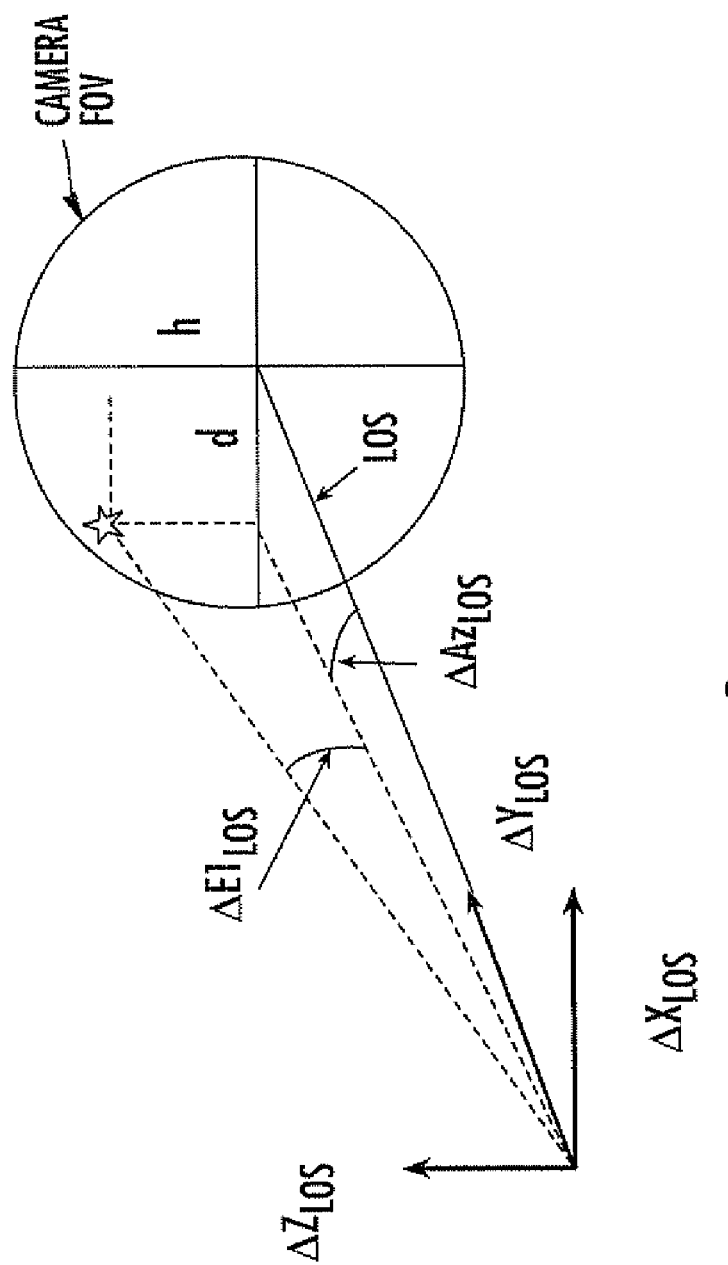
FIG. 3 is a notional representation of star tracker camera lines-of-sight and field-of-view, and some relevant angles.

FIG. 3 illustrates details of star image offset from the center of the star tracker camera field of view (FOV). The star tracking process utilizes the star ephemeris program to select stars and provides input to computation of the camera pointing commands. The ship's inertial navigation system (INS) and fire control systems (FCS) will provide the camera stabilization and control camera pointing. To determine the error due to ENU reference misalignment, the star tracker LOS vectors are determined from the star tracker measurements. Those LOS vectors are used to establish the unit vector attitude triad for comparison with the similar triad derived from the ephemeris data. The relation between those triads can be shown to be related by a small angle rotation matrix. That matrix can be expressed as the sum of symmetric and skew-symmetric parts. The skew-symmetric part is used to estimate the needed ENU misalignment correction by Batch Least Squares or Kalman Filter estimation process utilizing modeled non-ENU errors.

Ship sensor and alignment errors cause the LOS of the camera director to deviate from the true line-of-sight (LOS) to the selected star-based on ephemeris data. That deviation is measured by the star tracker as the star image offset from the center of star tracker's field-of-view (FOV). The star tracker error sources are depicted in the error decomposition diagram of FIG. 3. Star Tracker Pointing Error Equations are developed as follows:

True LOS vector to star:

$$\vec{X}_s^{los} = T_d^{los} T_o^d \vec{X}_s^o \tag{1}$$

Local LOS vector measured with star tracker:

$$\vec{\tilde{X}}_s^{los} = (I+\tilde{\epsilon}_{ss}^{los}) T_d^{los} (I+\tilde{\epsilon}_{ship}^d) T_o^d (I+\tilde{\epsilon}_{enu}^o) \vec{X}_s^o + \vec{\eta}_{fn}^{los} \tag{2}$$

where $$(I+\tilde{\epsilon}_{ss}^{los}) = (I+\tilde{\epsilon}_{refrac}^{loc} + \epsilon_{camera}^{loc})$$

$$(I+\tilde{\epsilon}_{ship}^d) = (I+\tilde{\epsilon}_{diralign}^d + \epsilon_{dirpoint}^d)(I+\tilde{\epsilon}_{gyroalign}^d + \epsilon_{gyroattitud}^d)$$

$$(I+\tilde{\epsilon}_{enu}^o) = (I+\tilde{\epsilon}_{vert}^o + \epsilon_{eph}^o + \epsilon_{nav}^o)$$

Star tracker pointing error vector (error measured by the star tracker camera) is:

$$\partial \vec{X}_s^{los} = \vec{\tilde{X}}_s^{los} - \vec{X}_s^{los} \tag{3}$$

$$= (I+\tilde{\epsilon}_{ss}^{los}) T_d^{los} (I+\tilde{\epsilon}_{ship}^d) T_o^d (I+\tilde{\epsilon}_{enu}^o) \vec{X}_s^o - T_d^{los} T_o^d \vec{X}_s^o + \vec{\eta}_{fn}^{los} \tag{3}$$

To determine the contribution to the camera LOS error vector from the ENU reference misalignment alone, the equation (3) can be rearranged as follows:

$$\vec{X}_s^o = (I-\tilde{\epsilon}_{enu}^o) \vec{\tilde{X}}_s^o \tag{4}$$

where $\epsilon_{enu}^o$ is the required correction

When the right side of Equation 4 is expanded gives equation (5)

$$(I+\tilde{\epsilon}_{enu}^o) \vec{X}_s^o = T_d^o (I-\tilde{\epsilon}_{ship}^d) T_{los}^d (I-\tilde{\epsilon}_{ss}^{los}) (\Delta \vec{X}_s^{los} + T_d^{los} T_o^d \vec{X}_s^o - \vec{\eta}_{fn}^{los}) \tag{5}$$

or $$(I+\tilde{\epsilon}_{enu}^o) \vec{X}_s^o = \vec{X}_s^{o'}$$

where $$\vec{X}_s^{o'} = T_d^o (I-\tilde{\epsilon}_{ship}^d) T_{los}^d (I-\tilde{\epsilon}_{ss}^{los}) (\Delta \vec{X}_s^{los} + T_d^{los} T_o^d \vec{X}_s^o - \vec{\eta}_{fn}^{los}) \tag{6}$$

$\vec{X}_s^o$ = true LOS vector to star in geodetic ENU frame $\vec{X}_s^{o'}$ = LOS vector to star in ship-established ENU frame $\vec{X}_s^{los}$ = true LOS vector to star in star tracker LOS frame (from ephemeris tables)

$\vec{\tilde{X}}_s^{los}$ = star LOS vector measured by star tracker camera in Star tracker LOS frame $\partial \vec{X}_s^{los}$ = star tracker pointing error vector LOS frame (measured by star camera)

$T_d^{los}$ = coordinate transformation from ship deck to star tracker LOS $T_o^d$ = coordinate transformation from ENU to ship deck I=unitary matrix $$\tilde{\varepsilon} = \text{skew-symmetric error matrix} = \begin{bmatrix} 0 & -\varepsilon_z & \varepsilon_y \\ \varepsilon_z & 0 & -\varepsilon_x \\ -\varepsilon_y & \varepsilon_x & 0 \end{bmatrix}$$

where $\varepsilon_{xyz}$ are small angular errors about xyz axes $\varepsilon_{eph}{}^o$=Ephemeris errors in local ENU frame $\varepsilon_{vert}{}^o$=Deflection of local vertical in ENU frame $\varepsilon_{nav}{}^o$=Navigation errors of ship INS in ENU frame $\varepsilon_{diralign}{}^d$=Errors in alignment of director to deck reference $\varepsilon_{dirpoint}{}^{los}$=Director pointing servo errors in director LOS frame $\varepsilon_{gyroalign}{}^d$=Ship gyro alignment errors in deck reference axes $\varepsilon_{gyroattitude}{}^d$=Ship gyro attitude measurement errors in deck reference axes $\varepsilon_{refrac}{}^{los}$=Atmospheric refraction of camera LOS in camera LOS frame $\varepsilon_{camera}{}^{los}$=Camera resolution and alignment to director LOS in camera LOS axes $\varepsilon_{ss}{}^{los}$=Star tracker errors combined in camera LOS frame $\varepsilon_{ship}{}^{los}$=Ship gyro and director errors combined in deck frame $\varepsilon_{enu}{}^o$=Combined navigation errors in ENU frame $$\vec{\eta}_{fn}{}^o = \vec{\eta}_{floor}{}^o + \vec{\eta}_{fbias}{}^o$$

$\vec{\eta}_{ffloor}{}^o$=Star tracker data filter noise floor in ENU reference frame $\vec{\eta}_{fbias}{}^o$=Star tracker data filter bias in ENU reference frame The image dissector type of star sensor camera or star tracker provides measurements directly applicable to determination of the ship's reference correction. The star tracker measures $\Delta Az_{LOS}$ and $\Delta El_{LOS}$ offset angles of the star image from the center of star tracker FOV as illustrated in FIG. 3. Those offset angles are used to compute the star tracker LOS angles relative to the star LOS angles computed from the ephemeris data. Because other non-ENU errors contribute to the above offset, the ENU misalignment can not be directly determined from the star tracker measurements. It is desirable to define a unit vector attitude triad for the ephemeris reference and for that measured by the star tracker and to compare the three-axis attitudes. An estimation process, applied to the results obtained from comparison of the two triads, is used to determine the misalignment of the ship's ENU reference.

In FIG. 3, $$\Delta Az_{LOS} = \text{Tan}^{-1}(d/f) \tag{7}$$

$$\Delta El_{LOS} = \text{Tan}^{-1}((h/f)\text{Cos } \Delta Az_{LOS}) \tag{8}$$

f=focal length of camera lens

The above difference angles ($\Delta$'s) should be available directly from the processing of the star tracker camera output by the video processor 30 of FIG. 2.

Given the $\Delta Az_{Los}$ and $\Delta El_{LOS}$, the error vector representing the deviation of the star image from the tracker camera's LOS is computed as:

$$\partial \vec{X}_s^{los} = \begin{bmatrix} \Delta X_{LOS} \\ \Delta Y_{LOS} \\ \Delta Z_{LOS} \end{bmatrix} = \begin{bmatrix} \text{Cos}\Delta El_{LOS}\text{Sin}\Delta Az_{LOS} \\ \text{Cos}\Delta El_{LOS}\text{Cos}\Delta Az_{LOS} \\ \text{Sin}\Delta El_{LOS} \end{bmatrix} \tag{9}$$

where $\partial \vec{X}_s^{los}$ is the LOS error vector measured by the star tracker.

Figure 4:
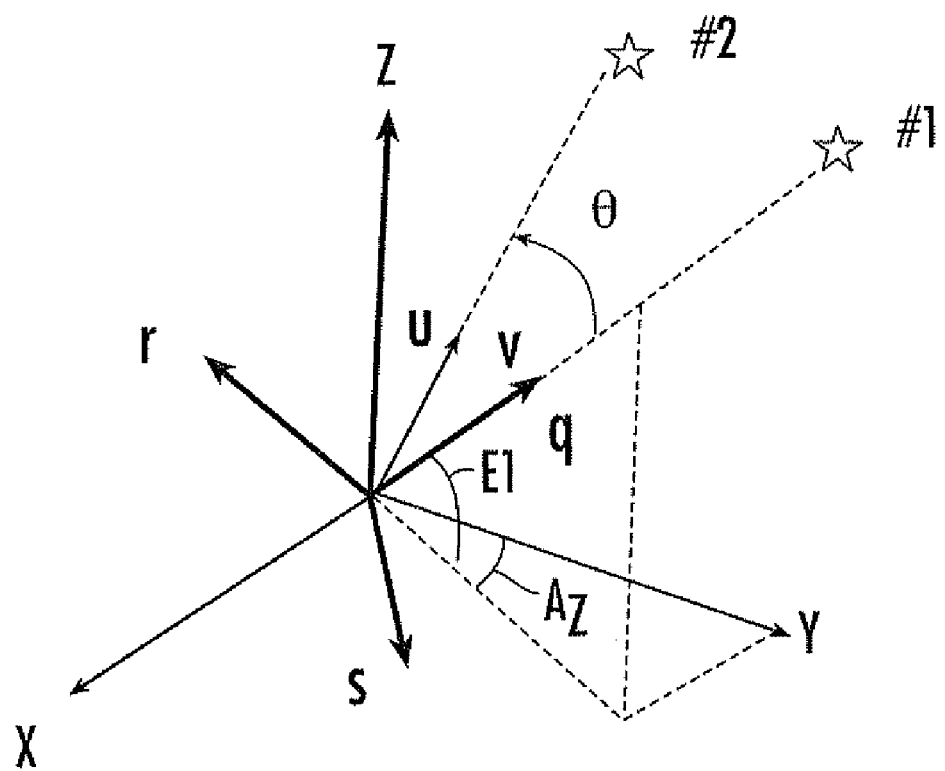
FIG. 4 is a diagram illustrating unit vector triads related to attitude.

The reference matrix $M_R$, described below in conjunction with FIG. 4, is computed directly from the star LOS angles ($Az_e{}^o, El_e{}^o$) determined by the star ephemeris program. To determine the unit vector attitude triad matrix $M_S$ for the star tracker LOS, the corresponding $\Delta Az_s{}^o, \Delta El_s{}^o$ angles are computed using the star tracker measurements of the angular difference between the camera's LOS and the star image in the camera's FOV. The star camera is mounted on the director with azimuth and elevation degrees of freedom only. Thus, the $\Delta$-LOS errors measured relative to the cross-hair axes of the camera lens rotates away from the true ENU alignment when the ship rolls. The $\Delta$-LOS must be corrected for the ship's roll before it can be added to ephemeris-derived LOS angles, by a rotation through the $\phi$-angle about the star tracker LOS axis as follows:

$$\Delta \vec{X}_s{}^o = T_{los}{}^o \Delta \vec{X}_s{}^{los}$$

Where, $\Delta \vec{X}_s{}^o$ is $\Delta$-LOS error vector in true ENU frame $\Delta \vec{X}_s{}^{los}$ is $\Delta$-LOS error vector relative to camera LOS $$T_{los}^o = \begin{bmatrix} C\phi_s & 0 & S\phi_s \\ 0 & 1 & 0 \\ -S\phi_s & 0 & C\phi_s \end{bmatrix} \tag{10}$$

=rotation about camera LOS axis

Where $|\phi_s| = (\text{Cos}^{-1}(\vec{u}_x{}^{los} \cdot \vec{n})/|\vec{n}|)$ $\vec{n} = \vec{u}_y{}^{los} \times \vec{u}_z{}^o$ $\vec{u}_y{}^{los}$ is unit vector along camera LOS axis.

$\vec{u}_z{}^o$ is unit vector along ENU ephemeris axis.

Thus, the star tracker LOS angles are:

$$Az_s{}^o = Az_e{}^o + \Delta Az_s{}^o$$

$$El_s{}^o = El_e{}^o + \Delta El_s{}^o \tag{11}$$

and the corresponding star tracker LOS vector in ENU is:

$$\vec{X}_s^o = \begin{bmatrix} X_s^O \\ Y_s^O \\ Z_s^O \end{bmatrix} = \begin{bmatrix} \text{Cos}El_s^o\text{Sin}Az_s^o \\ \text{Cos}El_s^o\text{Cos}Az_s^o \\ \text{Sin}El_s^o \end{bmatrix} \tag{12}$$

where:

$Az_s^o, El_s^o$ are azimuth and elevation angles of the star tracker LOS in ENU reference frame;

$Az_e^o, El_e^o$ are azimuth and elevation angles of the star LOS based on ephemeris data in ENU reference frame;

$\Delta Az_s^o, \Delta El_s^o$ are azimuth and elevation difference angles between the star image and star tracker LOS in camera FOV in ENU reference frame.

Angles $\Delta Az_s^o, \Delta El_s^o$ are computed as follows:

$\vec{X}_s^o$ is the star tracker LOS vector in ENU reference frame $$\Delta \vec{X}_s^o = T_d^o T_{los}^d \Delta \vec{X}_{los} \quad (13)$$

$$\Delta Az_s^o = \text{Tan}^{-1}(\Delta \vec{X}_s^o / \Delta \vec{Y}_s^o) \quad (14)$$

$$\Delta El_s^o = \text{Tan}^{-1}(\Delta Z_s^o / ((\Delta X_s^o)^2 + (\Delta Y_s^o)^2)^{1/2}) \quad (15)$$

$\partial \vec{X}_s^o$ is the star-tracker-measured error vector converted to ENU reference frame. Deck-to-ENU and star-tracker-LOS-to-deck coordinate transformations are $T_d^o, T_{los}^d$ where $T_{los}^d$ is computed with $Az_{los}^d, El_{los}^d$ director pointing angles.

The star and star tracker LOS vectors are computed for each star using the star ephemeris $Az_e^o, El_e^o$ and star tracker $Az_s^o, El_s^o$ LOS angles:

$$\vec{e}_1 = \begin{bmatrix} X_{e1}^o \\ Y_{e1}^o \\ Z_{e1}^o \end{bmatrix} = \begin{bmatrix} \text{Cos}El_{e1}^o \text{Sin}Az_{e1}^o \\ \text{Cos}El_{e1}^o \text{Cos}Az_{e1}^o \\ \text{Sin}El_{e1}^o \end{bmatrix} \quad (16)$$

$$\vec{e}_2 = \begin{bmatrix} X_{e2}^o \\ Y_{e2}^o \\ Z_{e2}^o \end{bmatrix} = \begin{bmatrix} \text{Cos}El_{e2}^o \text{Sin}Az_{e2}^o \\ \text{Cos}El_{e2}^o \text{Cos}Az_{e2}^o \\ \text{Sin}El_{e2}^o \end{bmatrix}, \text{ error correction} \quad (17)$$

$$\vec{s}_1 = \begin{bmatrix} X_{s1}^o \\ Y_{s1}^o \\ Z_{s1}^o \end{bmatrix} = \begin{bmatrix} \text{Cos}El_{s1}^o \text{Sin}Az_{s1}^o \\ \text{Cos}El_{s1}^o \text{Cos}Az_{s1}^o \\ \text{Sin}El_{s1}^o \end{bmatrix} \quad (18)$$

$$\vec{s}_2 = \begin{bmatrix} X_{s2}^o \\ Y_{s2}^o \\ Z_{s2}^o \end{bmatrix} = \begin{bmatrix} \text{Cos}El_{s2}^o \text{Sin}Az_{s2}^o \\ \text{Cos}El_{s2}^o \text{Cos}Az_{s2}^o \\ \text{Sin}El_{s2}^o \end{bmatrix} \quad (19)$$

where $\vec{e}_1, \vec{e}_2$ are $\vec{LOS}$ vectors to two ephemeris stars $\vec{s}_1, \vec{s}_2$ are vectors along two corresponding star tracker LOS directions $El_{e1}^o, El_{e2}^o, Az_{e1}^o, Az_{e2}^o$ are ephemeris LOS angles of two stars in ENU reference $El_{s1}^o, El_{s2}^o, Az_{s1}^o, Az_{s2}^o$ are corresponding star tracker LOS angles in ENU reference frame The three-axis attitude can be determined. FIG. 4 is a diagram showing decomposition of the star tracker error equations. The LOS vectors to two stars (separated in angle) at a given time allows establishing the unit vector triad defining the three-dimensional attitude of a body relative to a reference coordinate system. The general form of mathematical derivations of the attitude triads from the star LOS data are described in conjunction with FIG. 4. In FIG. 4, X, Y, and Z are the local inertial reference frame (ENU), and Az and El are the local (ENU) angles to a star. At a given time, for two v and u star LOS vectors, the unit vector attitude triad is computed as:

$$q = v$$

$$r = q \times u / \|q \times u\|$$

$$s = q \times r \quad (20)$$

where u, v are the unit LOS vectors to selected stars q, r, s are unit vectors representing the orthogonal attitude triad where $$v = \begin{bmatrix} X1 \\ Y1 \\ Z1 \end{bmatrix}; \quad u = \begin{bmatrix} X2 \\ Y2 \\ Z2 \end{bmatrix}; \quad q = \begin{bmatrix} q_x \\ q_y \\ q_z \end{bmatrix}; \quad r = \begin{bmatrix} r_x \\ r_y \\ r_z \end{bmatrix}; \quad s = \begin{bmatrix} s_x \\ s_y \\ s_z \end{bmatrix}, \quad (21)$$

| | |
|---|---|
| X1 = Cos (Elv) Sin (Azv) | X2 = Cos (Elu) Sin (Azu) |
| Y1 = Cos (Elv) Cos (Azv) | Y2 = Cos (Elu) Cos (Azu) |
| Z1 = Sin (Elv) | Z2 = Sin (Elu) |

(22),

X1,Y1,Z1 and X2,Y2,Z2 are components of v and u vectors, respectively, in true geodetic ENU frame, and Azv, Azu, Elv, Elu angles are the Azimuth and Elevation angles.

Applying the above definition to the reference and star tracker triad results in the following relations:

The orientation of the unit vector attitude triad relative to the geodetic reference coordinate frame is defined as the elements of a 3×3 attitude matrix $M_R$:

$$M_R = \begin{bmatrix} q_{Rx} & r_{Rx} & s_{Rx} \\ q_{Ry} & r_{Ry} & s_{Ry} \\ q_{Rz} & r_{Rz} & s_{Rz} \end{bmatrix} \quad (23)$$

The orientation of the star tracker LOS attitude triad relative to the ship gyro reference is defined by a similar 3×3 matrix $M_S$:

$$M_S = \begin{bmatrix} q_{Sx} & r_{Sx} & s_{Sx} \\ q_{Sy} & r_{Sy} & s_{Sy} \\ q_{Sz} & r_{Sz} & s_{Sz} \end{bmatrix} \quad (24)$$

Since both matrices $M_R$ and $M_S$ define orthogonal coordinate systems, they can be related by the following transformation:

$$AM_R = M_S \quad (25)$$

And thus $$A = M_S M_R^{-1} = M_S M_R^T \quad (26)$$

where T signifies transpose.

For this application, coordinate transformation matrix A is a 3×3 matrix representing the coordinate transformation between the true geodetic and star tracker LOS attitude triads expressed in the local-topocentric ENU coordinates. In this context, the word topocentric refers to the local horizon and vertical on an elliptic Earth model.

The star tracker measurements, besides the actual ENU misalignment error, will include all other non-navigation errors due to Fire Control System computations and star tracker stabilization and pointing controls. The actual attitude misalignment between the ship-maintained and true geodetic ENU reference is for the most part due to navigation errors caused by ship gyro attitude biases attributable to latitude and vertical deflection of the gravity vector. The gyro attitude drift contributes in a lesser way because its drift is averaged by gyro indexing. To estimate the actual misalignment between the ENU references, the skew-symmetric part of the A coordinate transformation matrix of equation (26) is obtained, and an estimation process is performed on its elements. The skew symmetric error matrix is obtained from the A matrix (of equation 26) as follows:

For a matrix A which has the inverse:

$$A = A_S + A_{SK} \quad (27)$$

$$A_S = (A + A^T)/2 \text{ is the symmetric matrix} \quad (28)$$

$$A_{SK} = (A - A^T)/2 \text{ is the skew-symmetric matrix} \quad (29)$$

and superscript T signifies matrix transpose.

$A_{SK}$ is of the form $$A_{SK} = \begin{bmatrix} 0 & -a_z & a_y \\ a_z & 0 & -a_x \\ -a_y & a_x & 0 \end{bmatrix} \quad (30)$$

where $$a_x = e_{x1} + e_{x2} + \ldots + e_{xn}$$

$$a_y = e_{y1} + e_{y2} + \ldots + e_{yn}$$

$$a_z = e_{z1} + e_{z2} + \ldots + e_{zn} \quad (31)$$

where $e_{xi}$, $e_{yi}$, and $e_{zi}$ are errors from individual sources included in the star tracker's measurements of the camera's LOS angle relative to LOS to the star.

The error model can take into account known error estimates. If $e_{x1}$, $e_{y1}$, and $e_{z1}$ in equation (31) are the error components representing the misalignment between the ENU references, the rest of the errors can be combined into a single value by Root-Sum-Square (RSS) method. The RSS'ed values can be represented by their RMS values to better represent the effect of their random and bias parts (assuming that the random part of the error is represented by the noise filter floor). For the above assumptions, the elements of the error model for the skew symmetric error matrix can be represented as $$a_x = e_{xenu} + e_{xest}$$

where $e_{xenu}$ is the actual ENU error along x-axis $e_{xest} = SQR(\Sigma e_{rms}^2)$, is RSS of RMS values of known estimates of total systematic errors along the x-axis.

$e_{xrms} = SQR(\sigma^2 + b^2)$, is RMS of systematic errors along x-axis where $\sigma$ is random error and b is bias error Similarly, the $a_y$ and $a_z$ components are computed for the y-axis and Z-axis respectively.

The ENU bias can be estimated. The $A_{SK}$ matrix can be computed. The navigation data (latitude, longitude and UTC time) provided by the Aegis weapon control system (WCS) to the ephemeris computations is expected to be relatively noise-free. The star camera measurement noise attributable to vibration of the director can be reduced by additional filtering at the star tracker output. Since the star tracker camera is mounted on a space stabilized platform, and the residual ship motion occurs with a very large period, it can be assumed that all errors are constant within the sample interval of interest. Under those conditions, a batch least squares or averaging estimator should be sufficient to determine the alignment error between the ENU references. To compute the ENU misalignment, $A_{SK}$ error matrix in equation (30) can be rewritten as:

$$A_{SK} = A_{ENU} + A_{EST} \quad (32)$$

Or $$A_{ENU} = A_{SK} - A_{EST} \quad (33)$$

where $A_{ENU}$ is the skew symmetric error matrix representing misalignment of ENU references, and $A_{EST}$ is the skew symmetric error matrix representing the non-ENU errors present in the star tracker measurements of the camera LOS. Those errors are assumed to remain constant over the batch sample.

Since stars can be treated as stationary objects over the batch processing period and star tracker camera is mounted on the stable platform, a batch least squares or averaging process should be adequate for the determination of misalignment between the ENU references and for obtaining a "fix" sufficient for alignment of the ship's ENU reference. The correction of the ENU reference is applied as the small angle rotation matrix $A_{ENU}$ to the coordinate transformations from the ship's-ENU-to-ECEF and ENU-to-ship-deck reference coordinates $$\overline{A}_{ENU} 1/N \sum_{i=1}^{N} A_{ENU,i} \quad (34)$$

where $\overline{A}_{ENU}$ is the averaged value of the skew-symmetric error matrix over the batch interval of star tracker measurements.

The estimated attitude correction required to align the ship $E_S N_S U_S$ reference to the true geodetic $E_R N_R U_R$ coordinates is obtained by the following coordinate transformation $$(E_R, N_R, U_R)^T = (I + \overline{A}_{ENU})(E_S N_S U_S)^T$$

where:

I is the 3×3 unit matrix and T signifies transpose.

As an example, the following transformation converts the target track data obtained in the ship ENU reference to the true local geodetic ENU coordinates $$\begin{pmatrix} X_R^0 \\ Y_R^0 \\ Z_R^0 \end{pmatrix} = (I + \overline{A}_{ENU}) \begin{pmatrix} X_S^0 \\ Y_S^0 \\ Z_S^0 \end{pmatrix} \quad (36)$$

where:

$X_s^0, Y_s^0$, and $Z_s^0$ is the target position measured in ship local ENU coordinates;

$X_s^0, X_s^0$, and $X_s^0$ is the target position in local true (geodetic) ENU coordinates.

Coordinate transformation from the local ENU to ship deck axes ($T_o^d$) is given by $$T_o^d = \begin{bmatrix} C\Psi C\phi - S\Psi S\theta S\phi & S\Psi C\phi + C\Psi S\theta S\phi & C\theta S\phi \\ -S\Psi C\theta & C\Psi C\theta & -S\theta \\ -C\Psi S\phi + S\Psi S\theta C\phi & C\Psi S\theta C\phi - S\Psi S\theta & C\theta C\phi \end{bmatrix} \quad (37)$$

where C=Cos, S=Sin and $\Psi, \theta, \phi$ are ship attitude angles measured by the ship gyro.

Coordinate Transformation from ship deck to director LOS axes ($T_d^{los}$) is given by $$T_d^{los} = \begin{bmatrix} CAz_d & -Saz_d & 0 \\ SAz_dCEl_d & CAz_dCEl_d & -SEl_d \\ SAz_dSEl_d & CAz_dSEl_d & CEl_d \end{bmatrix} \quad (38)$$

$$Az_d = \text{Tan}^{-1}(Xd/Yd) \quad (39)$$

$$El_d = \text{Tan}^{-1}(Zd/(Xd^2+Yd^2)^{1/2}) \quad (40)$$

where:

$Az_d, El_d$ are star LOS angles in deck reference axes; and $Xd, Yd, Zd$ are star LOS vector components in deck coordinates.

In operation of a ship inertial navigation system ENU calibration arrangement according to an aspect of the invention, a star tracker camera is mounted on a platform stabilized by the ship's inertial navigation system. In the context of an Aegis ship, the stabilized platform may be the illumination director. A star ephemeris program selects stars and provides data for computation of the camera pointing. The camera pointing in an Aegis context is provided by the fire control system (FCS). Ideally, the star tracker camera is capable of tracking stars in daylight, as well as at night. To determine the error due to ENU reference misalignment, the star tracker LOS vectors are determined from the star tracker measurements, and those LOS vectors are used to establish the unit vector attitude triad for comparison with the similar triad derived from the ephemeris data. The triads are related by a small angle rotation matrix. That matrix can be expressed as the sum of symmetric and skew-symmetric parts. The skew-symmetric part is used to estimate the ENU misalignment correction. The estimation may be by Batch Least Squares or Kalman Filter estimation process utilizing modeled non-ENU errors.

Thus, a method according to an aspect of invention is for calibration of an attitude reference apparatus (16). The method comprises the steps of providing an inertial navigation system (16) for a surface (or surfaced) ship (10), which navigation system (16) provides local reference of ship's attitude relative to East, North, and UP. The method also includes the step of providing a star tracker camera (24) mounted on a platform (12) stabilized by the local reference of ship's attitude (16, 18). The star tracker (24, 30) compares azimuth (Az) and elevation (El) angles between lines-of-sight (LOS) between the star tracker (24, 30) and each of two selected stars, to thereby generate first and second azimuth ($\Delta Az$) and elevation ($\Delta El$) difference angles. The line-of-sight of the star tracker is controlled in response to ephemeris (from 34) of the two selected stars. The azimuth and elevation difference angles ($\Delta Az, \Delta El$) are processed to determine the star tracker local azimuth and elevation angle (equation 11) to thereby determine the star tracker attitude triad, (represented by the matrix ($M_S$)). The geodetic reference attitude triad matrix ($M_R$) is derived from the star local azimuth and elevation angles (Az, El) provided by the star ephemeris program. The $M_S$ and $M_R$ matrices are processed (Equations 25, 26) to determine A-matrix (which in general will be a small angle) representing the coordinate transformation between the $M_S$ and $M_R$ matrices. The A-matrix can be separated into the ENU reference and systematic error parts (Equation 27). The ship's ENU attitude calibration to true geodetic reference can be estimated (Equation 36) from the ENU error $A_{ENU}$ by batch least squares or averaging process (equation 34) applied to a time sequence of $A_{ENU}$ samples. The calibrated navigation system attitude is used as a reference for all sensed data relating to targets which is transmitted to other platforms.

What is claimed is:

1. A method for calibration of an attitude reference apparatus, said method comprising the steps of:

providing an inertial navigation system for a surface ship, which navigation system provides local reference of the ship's attitude relative to East, North, and UP;

providing a star tracker mounted on a platform stabilized by said local reference of the ship's attitude, said star tracker being for comparing the azimuth and elevation angles between the line-of-sight of said star tracker and each of two selected stars, to thereby generate first and second azimuth and elevation differences;

controlling said line-of-sight of said star tracker in response to ephemeris of said two selected stars;

processing said azimuth and elevation angles to determine first and second vector triads representing ephemeris and the navigation system attitude;

processing said first and second triads to determine a coordinate transformation matrix;

separating said coordinate transformation matrix into systematic error and reference attitude error; and combining the reference attitude error with the navigation system attitude to generate calibrated navigation system attitude.

2. A method for calibration according to claim 1, further comprising the steps of:

generating sensed data referenced to said calibrated navigation system attitude; and transmitting said sensed data referenced to said calibrated navigation system attitude to a remote location.

3. A method according to claim 1, wherein said step of processing said azimuth and elevation angles to determine first and second vector triads representing ephemeris and the navigation system attitude comprises the steps of:

determining the star tracker local azimuth and elevation angles;

determining the star tracker attitude triad from the local azimuth and elevation angles; and determining the geodetic reference attitude triad from ephemeris and the local azimuth and elevation angles.

4. A method according to claim 3, wherein:

said step of determining the star tracker local azimuth and elevation angles comprises computing $$Az_s^o = Az_e^o + \Delta Az_s^o$$

$$El_s^o = El_e^o + \Delta El_s^o \quad (11)$$

where:

$\Delta Az_s^o$ is the azimuth difference angle measured by the star tracker between the star tracker line-of-sight to one star; and $\Delta El_s^o$ is the elevation difference angle measured by the star tracker between the star tracker line-of-sight to that one star.

said step of determining the star tracker attitude triad from the local azimuth and elevation angles comprises computing $$q = v$$

$$r = q \times u / \|q \times u\|$$

$$s = q \times r \quad (20)$$

where u, v are the unit LOS vectors to selected stars q, r, s are unit vectors representing the orthogonal attitude triad where $$v = \begin{bmatrix} X1 \\ Y1 \\ Z1 \end{bmatrix}; \quad u = \begin{bmatrix} X2 \\ Y2 \\ Z2 \end{bmatrix}; \quad q = \begin{bmatrix} q_x \\ q_y \\ q_z \end{bmatrix}; \quad r = \begin{bmatrix} r_x \\ r_y \\ r_z \end{bmatrix}; \quad s = \begin{bmatrix} s_x \\ s_y \\ s_z \end{bmatrix}, \quad (21)$$

$$X1 = \cos(Elv)\sin(Azv) \quad X2 = \cos(Elu)\sin(Azu)$$

$$Y1 = \cos(Elv)\cos(Azv) \quad Y2 = \cos(Elu)\cos(Azu)$$

$$Z1 = \sin(Elv) \quad Z2 = \sin(Elu) \quad (22),$$

and said step of determining the geodetic reference attitude triad from ephemeris and the local azimuth and elevation angles is performed by computing attitude matrix $M_R$ $$M_R = \begin{bmatrix} q_{Rx} & r_{Rx} & s_{Rx} \\ q_{Ry} & r_{Ry} & s_{Ry} \\ q_{Rz} & r_{Rz} & s_{Rz} \end{bmatrix} \text{ and matrix } M_s: \quad (23)$$

-continued $$M_S = \begin{bmatrix} q_{Sx} & r_{Sx} & s_{Sx} \\ q_{Sy} & r_{Sy} & s_{Sy} \\ q_{Sz} & r_{Sz} & s_{Sz} \end{bmatrix} \quad (24)$$

related by the transformation:

$$AM_R = M_S \quad (25).$$

5. A method according to claim 1, wherein said step of combining the reference attitude error with the navigation system attitude to generate calibrated navigation system attitude comprises the steps of computing matrix $$\overline{A}_{ENU} 1/N \sum_{i=1}^{N} A_{ENU,i} \quad (34)$$

where $$A_{ENUi} = A_{SKi} - A_{EST}, i = 1 \ldots n$$

for correcting the ship ENU to geodetic ENU.

6. A method for calibration of an attitude reference apparatus, said method comprising the steps of:

providing an inertial navigation system for a surface ship, which navigation system provides local reference of the ship's attitude relative to East, North, and UP;

providing a star tracker mounted on a platform stabilized by said local reference of the ship's attitude, said star tracker being for comparing the azimuth and elevation angles between the line-of-sight of said star tracker and each of two selected stars, to thereby generate first and second azimuth and elevation differences;

controlling said line-of-sight of said star tracker in response to ephemeris of said two selected stars;

processing said azimuth and elevation angles to determine first and second vector triads representing ephemeris and the navigation system attitude, respectively;

processing said first and second triads to determine a coordinate transformation matrix;

separating said coordinate transformation matrix into systematic error and reference attitude error;

generating sensed data referenced to said navigation system attitude; and correcting said sensed data by said coordinate transformation matrix.

* * * * *

UNITED STATES PATENT AND TRADEMARK OFFICE
CERTIFICATE OF CORRECTION

Page 1 of 1

PATENT NO. : 7,451,022 B1
APPLICATION NO. : 11/647053
DATED : November 11, 2008
INVENTOR(S) : Jerzy W. Luk-Paszyc and John B. Stetson It is certified that error appears in the above-identified patent and that said Letters Patent is hereby corrected as shown below:

In Column 1, before line 1 insert the following:

-- GOVERNMENTAL INTEREST

This invention was made with government support under Contract N00024-03-C-6110. The United States government has certain rights in this invention. --

Signed and Sealed this
Tenth Day of July, 2012

David J. Kappos
*Director of the United States Patent and Trademark Office*